(12) United States Patent
Wilson et al.

(10) Patent No.: US 7,620,796 B2
(45) Date of Patent: Nov. 17, 2009

(54) SYSTEM AND METHOD FOR ACCELERATION OF STREAMS OF DEPENDENT INSTRUCTIONS WITHIN A MICROPROCESSOR

(75) Inventors: Sophie M. Wilson, Cambridge (GB); Alexander J. Burr, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 11/653,277

(22) Filed: Jan. 16, 2007

(65) Prior Publication Data

US 2007/0168647 A1   Jul. 19, 2007

Related U.S. Application Data

(60) Provisional application No. 60/758,536, filed on Jan. 13, 2006.

(51) Int. Cl.
*G06F 9/38* (2006.01)
(52) U.S. Cl. .............................. 712/41; 712/34; 712/36
(58) Field of Classification Search ................... 712/34, 712/36, 41, 43, 229
See application file for complete search history.

(56) References Cited

U.S. PATENT DOCUMENTS

2004/0003215 A1*   1/2004   Krimer et al. ............... 712/235
2006/0212678 A1*   9/2006   De Oliveira .................. 712/11

OTHER PUBLICATIONS

Ye et al., "Chimaera: A High-Performance Architecture with a Tightly-Coupled Reconfigurable Functional Unit", Proceedings of the 27th Annual Symposium on Computer Architecture, IEEE, Jun. 10-14, 2000, pp. 225-235.*
Singh et al., "MorphoSys: An Integrated Reconfigurable System for Data-Parallel and Computation-Intensive Applications", IEEE Transactions on Computers, May 2000, vol. 49, iss. 5, pp. 465-481.*

* cited by examiner

*Primary Examiner*—William M Treat
(74) *Attorney, Agent, or Firm*—Sterne, Kessler, Goldstein & Fox PLLC

(57) ABSTRACT

A system and method for accelerated processing of streams of dependent instructions, such as those encountered in the G.726 codec, in a microprocessor or microprocessor-based system/chip. In a preferred implementation, a small RISC-like special purpose processor is implemented within a larger general purpose processor for handling the streams of dependent instructions.

17 Claims, 5 Drawing Sheets

SYSTEM AND METHOD FOR ACCELERATION OF STREAMS OF DEPENDENT INSTRUCTIONS WITHIN A MICROPROCESSOR

CROSS-REFERENCE TO RELATED APPLICATIONS

The present application claims the benefit of U.S. Provisional Patent Application No. 60/758,536 filed on Jan. 13, 2006, which is incorporated herein by reference in its entirety.

BACKGROUND OF THE INVENTION

1. Field of the Invention

The present invention is generally directed to microprocessor devices. In particular, the present invention relates to microprocessor devices that accelerate the processing of a set of instructions.

2. Background

Conventional processor implementations use pipelines to maximize the utilization of processor resources in solving streams of instructions. In order to obtain larger gains, some processor implementations duplicate key components or entire pipelines to allow multiple instructions to be processed simultaneously. The downside of this approach is that when a stream of dependent instructions is received for processing, the processor is forced to wait for the result of the earlier instructions in order to begin processing the later instructions. This bottleneck results in inefficient usage of processing resources as, regardless of how many duplicate key components or pipelines are available, it is necessary to process the entire stream of dependent instructions one instruction at a time. Each instruction in the stream of dependent instructions must thereby wait for its dependency to be resolved before it can be executed.

The bottleneck effect caused by the execution of streams of dependent instructions is exacerbated when running a code base that includes numerous streams of dependent instructions, such as code bases used to implement the G.726 speech codec.

Accordingly, what is desired is a system and method that resolves the problem of bottlenecks associated with the processing of dependent instructions within a microprocessor.

BRIEF SUMMARY OF THE INVENTION

The present invention is directed to a specialized processing unit termed a sequential accelerator ("SA") to support instruction processing. The SA works together with a primary processing unit ("processor") to process a subset of instructions sent to the primary processing unit. In particular, and as will be described in more detail herein, embodiments of the invention provide a method, system, and a pipeline for processing instructions at improved speeds without occupying the primary processing unit.

In accordance with an embodiment of the present invention, a method of processing instructions in an integrated circuit (IC) chip comprising a processor and a sequential accelerator is provided. In accordance with the method, one or more operations to be processed by the sequential accelerator are stored. The processor then receives and processes a first instruction. Responsive to the processing of the first instruction by the processor, the sequential accelerator processes the one or more operations and provides the results of the one or more operations to the processor.

In accordance with another embodiment of the present invention, an IC for processing sequential instructions comprises a processor and a sequential accelerator. The processor is configured to transfer to the sequential accelerator one or more operations to be processed by the sequential accelerator. In particular, the processor is configured to transfer the one or more operations when the processor executes an instruction triggering processing by the sequential accelerator of the one or more operations.

Furthermore, a pipeline in accordance with another embodiment of the present invention is located within a processor and comprises an instruction decode stage and an instruction configuration path. The instruction configuration path is used for configuring a sequential accelerator to process an operation, wherein if the instruction decode stage receives an instruction requesting the configuration of the sequential accelerator to process the operation, the instruction decode stage decodes the instruction to determine the operation to be processed by the sequential accelerator and triggers the configuration of the sequential accelerator, using the instruction configuration path, to enable it to process the operation.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
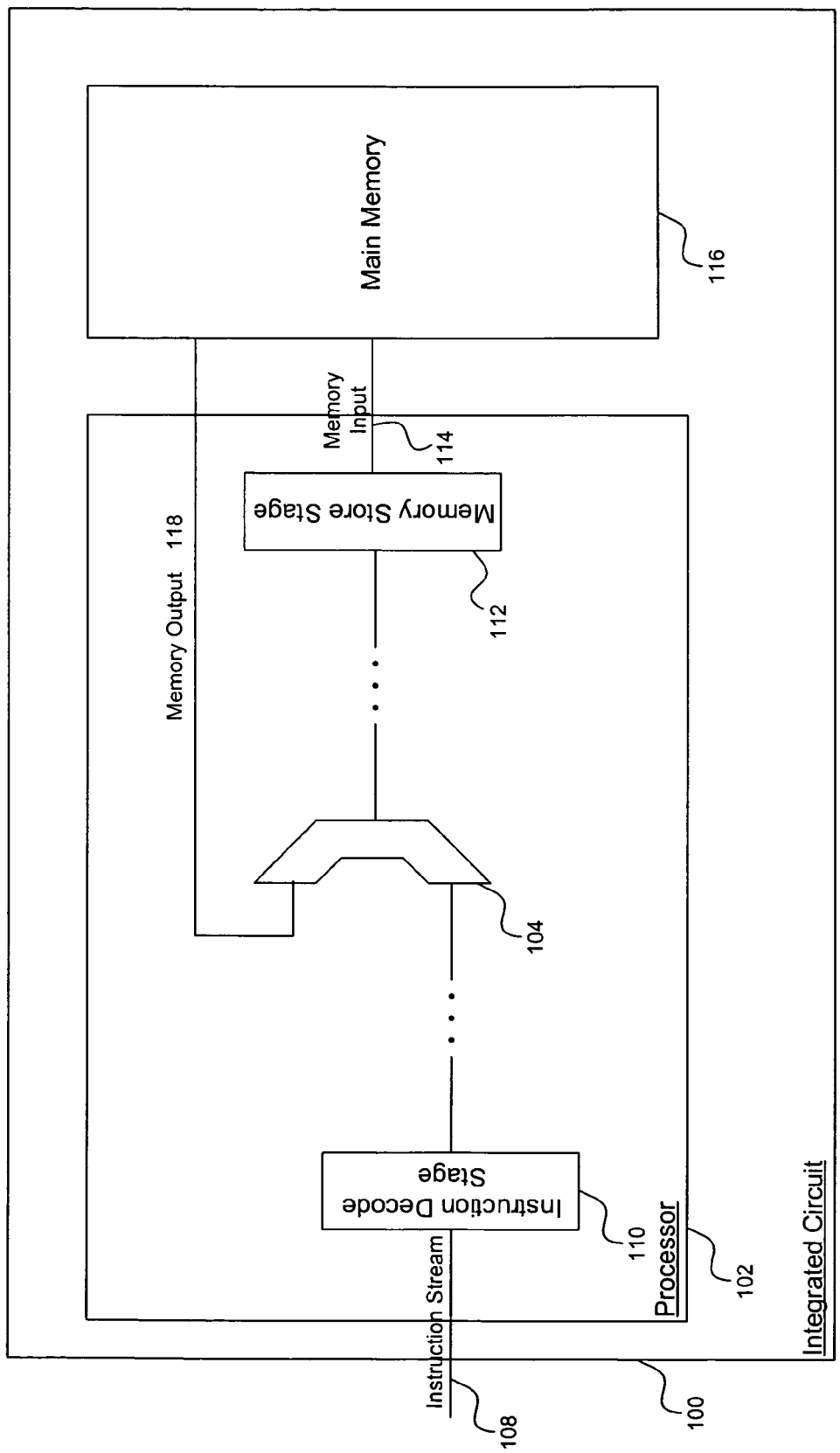
FIG. 1 depicts a prior art implementation for sequential processing of instructions consisting of an arithmetic logic unit (ALU) within a pipeline in a processor.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction to the Sequential Accelerator

Common to many conventional processor implementations is the usage of a pipeline in order to process multiple instructions quickly by preventing an instruction from having to wait for previous instructions to finish executing before starting its own execution. Generally, pipelined processors are divided into multiple stages, where in each stage the processor does a bit more of the processing necessary to complete the task required by an instruction. For example, there may be a stage devoted to retrieving the data needed by an instruction from the memory, so that this data is available in a subsequent stage.

FIG. 1 depicts a prior art implementation of such a pipelined processor 102 on an integrated circuit 100. Processor 102 receives a stream of instructions 108 which are then sent to a first pipeline stage, such as instruction decode stage 110. After similar subsequent stages of gradual processing, the instruction is passed to an arithmetic logic unit (ALU) 104 which does the actual computation requested by the instruction. For example, the computation may consist of adding a number received from a main memory 116 over a memory output bus 118 to another number. The result from ALU 104 is then passed on to any subsequent stages of the pipeline, like memory store stage 112 which then feeds the result over a memory input bus 114 to main memory 116 for storage.

ALU 104 is only capable of processing a single instruction at a time. To offset this bottleneck, conventional processor implementations consisting of multiple pipelines (or, in many cases, duplicate segments of a pipeline) speed up processing by allowing instructions to be executed concurrently. Additional conventional processor implementations speed up processing by introducing data parallelism, such as with a single-instruction, multiple-data (SIMD) architecture, in order to increase the overall amount of data processed within a processing time unit. These methods are suitable as long as the instructions being processed are independent, meaning that a subsequent instruction is not dependent on knowledge of the result of a prior instruction. An extensive sequence of dependent instructions will, therefore, slow the performance of a normally efficient parallel processing architecture. For example, superscalar processors, with parallel sections of instructions dispatched to duplicate functional units, suffer performance problems when encountering a sequence of dependent instructions.

As will be described in more detail herein, by using a sequential accelerator (SA) in accordance with an embodiment of the present invention, these sequences of dependent instructions are identified and separated for efficient processing. In particular, a small RISC-like special purpose processor is implemented within a larger general purpose processor for handling the sequences of dependent instructions. In one implementation, the special purpose processor, acting as the system's SA, frees up to seven processor cycles by necessitating only one instruction to the general purpose processor to trigger the execution of eight dependent instructions within the SA. Even in the event that the general purpose processor is required to wait for the results of processing the sequence of dependent instructions, the results are obtained in less time due to the higher operating speed of the SA. In another implementation, the SA is operable to process instructions at a rate twice as fast as the larger general purpose processor, and can free up to four processor cycles by executing eight dependent instructions in half the time.

A processor implementation in accordance with the present invention is particularly useful in speeding up the processing of code bases that include numerous sequences of dependent instructions, such as a code base for implementing the G.726 speech codec.

B. Operation of the Sequential Accelerator

Figure 2:
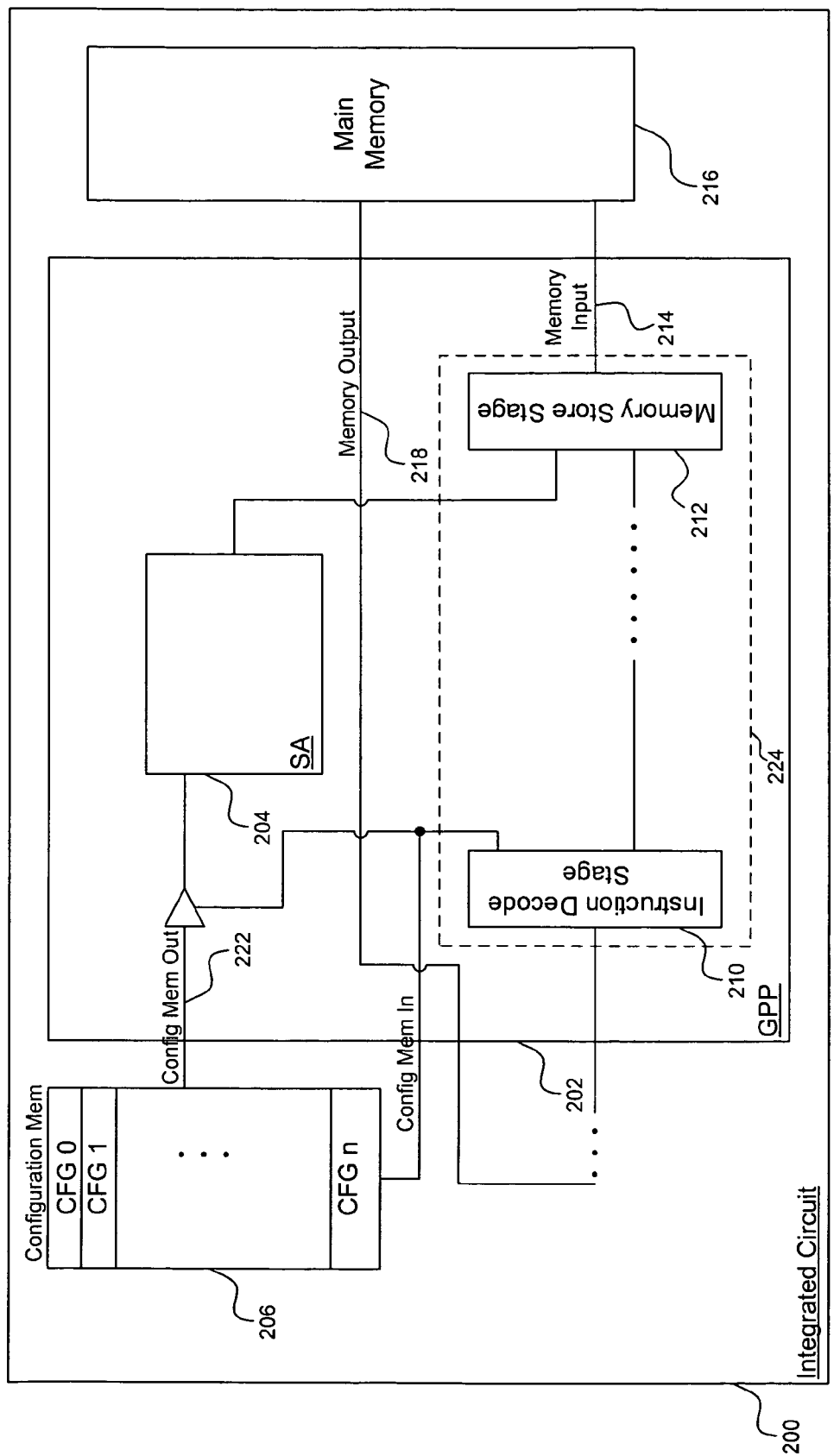
FIG. 2 depicts a system view of a sequential accelerator system within a pipeline in a processor, as well as a supporting configuration memory, in accordance with an embodiment of the present invention.

FIG. 2 depicts an integrated circuit ("IC") 200 that contains an example system for performing sequential acceleration in hardware in accordance with an embodiment of the present invention. As shown in FIG. 2, IC 200 contains a processor 202, also referred to herein as general purpose processor ("GPP") 202, a main memory 216, and a configuration memory 206.

Configuration memory 206 is connected to GPP 202 via a configuration memory in ("config mem in") bus 220 and a configuration memory out ("config mem out") bus 222. Main memory 216 is connected to GPP 202 via a memory input bus 214 and a memory output bus 218. In accordance with an embodiment of the present invention, main memory 216 is an external memory device, such as a random access memory chip. In accordance with an additional embodiment of the present invention, main memory 216 comprises one or more data registers. In accordance with a further embodiment of the present invention, memory 216 is a register file located within GPP 202. One skilled in the relevant arts will further appreciate that memory 216 may be any data storage location, either internal or external to GPP 202, and it should be understood that the aforementioned embodiments have been presented by way of example only, and not limitation.

As further shown in FIG. 2, GPP 202 includes a processing pipeline 224 as well as a sequential accelerator ("SA") 204. As will be described in more detail herein, processing pipeline 224 is configured to process instructions from a first instruction set which are fetched from main memory 216, while SA 204 is configured to process instructions from a second instruction set which are provided from configuration memory 206. In accordance with an embodiment of the present invention, SA 204 is a specialized processing unit operable to process the second instruction set, which is a subset of the first instruction set, and not a complete processor. In accordance with an additional embodiment of the present invention, SA 204 is implemented as a complete processor, wherein the second instruction set comprises a complete set of instructions. In accordance with a further embodiment of the present invention, SA 204 is operable to process the second instruction set, including instructions that are not present in the first instruction set. The availability of instructions within the second instruction set which are not part of the first instruction set may be beneficial if, for example, the instructions have been identified as necessarily occurring as part of a dependent stream of instructions, and would therefore be processed by SA 204. One skilled in the relevant arts will appreciate that benefits from using SA 204 may be associated with a simpler, faster, and less costly implementation of SA 204, but that the particular instruction set associated with this implementation may vary.

In particular, processing pipeline 224 includes a number of stages that are utilized to execute instructions fetched from main memory 216. These stages include an instruction decode stage 210 and a memory store stage 212, as well as one or more intervening pipeline stages, which are not shown in FIG. 2 for the sake of convenience. Instruction decode stage 210 is operable to receive instructions destined for processing by GPP 202 from main memory 216 via memory output bus 218. Persons skilled in the relevant art(s) will appreciate that in any given processor implementation there is not necessarily any one pipeline stage that performs all of the functions of the instruction decode stage 210, but it is shown as a single stage for simplicity.

Instruction decode stage 210 is connected between configuration memory 206 and SA 204 in a manner that allows it to trigger the sending of a configuration from configuration memory 206 to SA 204. The results of processing by SA 204 are sent to a memory store stage 212 within pipeline 224, which communicates the results over memory input bus 214 to main memory 216 for storage.

Processing by GPP 202 occurs in parallel to the processing by SA 204. As noted above, instruction decode stage 210 is connected to the memory store stage 212, with other stages of a pipeline between them. This path handles the processing of general instructions not sent to SA 204. Persons skilled in the relevant art(s) will appreciate that the entire pipeline is not shown for the sake of simplicity, and that there could be several stages between instruction decode stage 210 and memory store stage 212 comprising the pipeline. Furthermore, persons skilled in the relevant art(s) will also appreciate that instruction decode stage 210, memory store stage 212, and any other stages between them can be implemented within a single combined stage, in accordance with an embodiment of the present invention.

Although FIG. 2 shows SA 204 contained within GPP 202, persons skilled in the relevant art(s) based on the teachings provided herein will appreciate that SA 204 may be located externally with respect to the physical structures that comprise GPP 202 provided GPP 202 is able to communicate with it.

Figure 3:
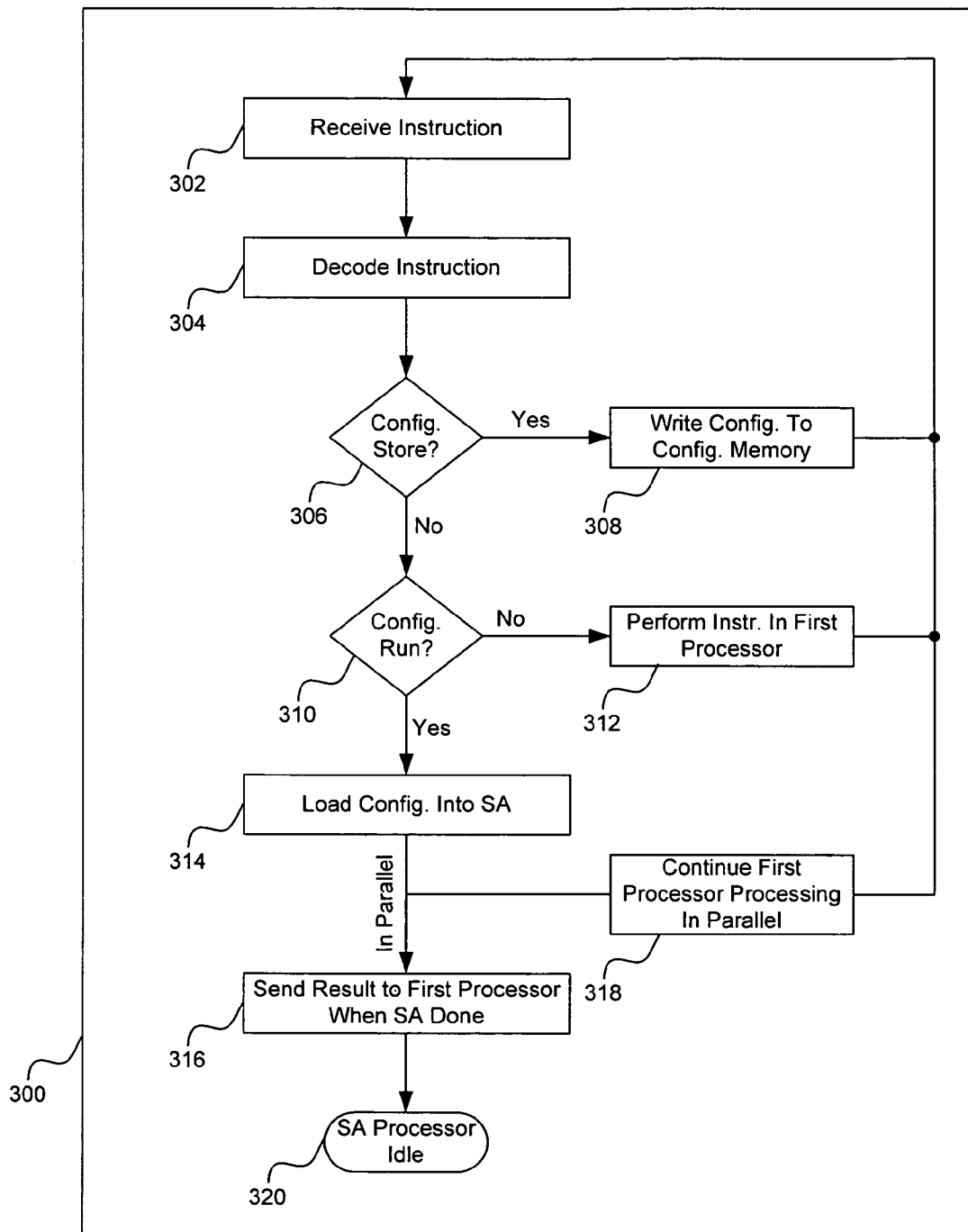
FIG. 3 illustrates a flow chart of a sequential accelerator system describing the setup and execution of a configuration used by the sequential accelerator in accordance with an embodiment of the present invention.

FIG. 3 illustrates a flowchart 300 of the processes by which IC 200 is operable to perform sequential acceleration of dependent instructions. Persons skilled in the relevant art(s) will appreciate that SA 204 may be operable to process independent instructions, but its optimal application is for accelerating the processing a series of dependent instructions. The method of flowchart 300 will now be described with continued reference to the example system for performing sequential acceleration in hardware described above in reference to FIG. 2. However, the present invention is not limited to that implementation.

As shown in FIG. 3, the method of flowchart 300 begins at step 302 in which GPP 202 receives an instruction. In particular, instruction decode stage 210 within pipeline 224 receives an instruction from main memory 216 via memory output bus 218.

The instruction received by instruction decode stage 210 is then decoded as indicated in step 304. Decoding the instruction entails, in part, determining what kind of processing is necessary in order to fulfill the requirements of the instruction. In order to determine what kind of processing is necessary, instruction decode stage 210 first determines whether the instruction is an instruction to store a configuration, as indicated in step 306. In accordance with an embodiment of the invention, the instruction to store a configuration is referred to as the "PUTCFG" instruction.

If instruction decode stage 210 determines that the instruction is a PUTCFG instruction, then instruction decode stage 210 writes the configuration to memory, as indicated in step 308. The configuration is written by instruction decode stage 210 to configuration memory 206 over config mem in bus 220, as shown in FIG. 2. After the PUTCFG instruction is processed, GPP 202 is operable to receive another instruction in accordance with step 302 in FIG. 3. Persons skilled in the relevant art(s) will appreciate that the step of writing the configuration to memory does not necessarily have to be performed by instruction decode stage 210 of a pipeline such as pipeline 224, but can rather be performed at any stage of a pipeline or at any point during processing in a non-pipelined implementation of GPP 202.

In accordance with an implementation of the present invention, an instruction similar to PUTCFG is used to get a configuration ("GETCFG") in order to verify the contents written to the configuration memory 206 by a PUTCFG instruction, although this operation is not illustrated in FIG. 3.

Returning now to step 306, if instruction decode stage 210 determines that the instruction is not an instruction to store a configuration, then processing proceeds to step 310. At step 310, instruction decode stage 210 determines whether the instruction is a configuration run instruction. If the instruction is not a configuration run instruction, then the instruction is of a type meant for processing by GPP 202. Accordingly, the instruction is processed within the GPP 202 as shown in step 312. GPP 202 processes the instruction by operation of the various stages of pipeline 224 until it reaches a final stage, such as memory store stage 212 where a result of the instruction is written out to main memory 216.

If the instruction has otherwise been determined to be a configuration run instruction as shown in step 310, then the configuration that should be run according to the instruction is loaded into SA 204, as shown in step 314. The instruction decode stage 210 operates a communication channel, such as config mem out bus 222, in order to transfer the configuration corresponding to a configuration number encoded in the configuration run instruction from configuration memory 206 to SA 204. In accordance with an embodiment of the present invention, the configuration run instruction also contains constants and result register information used by SA 204 in processing the configuration. SA 204 is then operable to process the configuration.

Persons skilled in the relevant art(s) will appreciate that the order in which the instruction is determined to be either a configuration store instruction (as shown in step 306) or a configuration run instruction (as shown in step 310), or some other type of instruction can be freely changed, and is only shown in the particular order used in flowchart 300 for by way of example.

With the SA 204 configured as a result of step 314, GPP 202 is operable to continue processing further instructions in parallel with the processing of the configuration by SA 204, as shown in step 318. When SA 204 has completed its processing, it sends its results to memory store stage 212, as shown in step 316, which then communicates the results over memory input 214 of main memory 216 for storage. SA 204 then remains idle until the next configuration is executed, as shown in step 320, in accordance with an embodiment of the present invention.

When SA 204 has been configured to process a series of dependent instructions, as long as the end result is obtained prior to a point in time in which a result would have been available by executing the same instructions through pipeline 224 of GPP 202, then there is a related improvement in processing speed. Since the dependent instructions being processed by SA 204 are only dependent on each other, there is no need for SA 204 to communicate with GPP 202 until it has completed its processing, and SA 204 can be clocked independently of GPP 202. In accordance with an embodiment of the present invention, SA 204 is accelerated to twice the clock rate of GPP 202. Persons skilled in the relevant art(s) based on the teachings provided herein will further appreciate that SA 204 could be clocked at other clock rates, including even higher clock rates, or independently of the timing of the clock used by GPP 202. Additionally, the SA 204 may operate asynchronously, regardless of whether GPP 202 is clocked or operates asynchronously as well.

In the example system of FIG. 2, SA 204 is able to sustain a higher clock rate than GPP 202 by performing only a subset of the operations that GPP 202 is capable of performing, in accordance with an embodiment of the present invention. In accordance with a further embodiment of the present invention, the performance of SA 204 is improved by restricting its register resources. For example, SA 204 does not perform memory reads and writes since those are time consuming processes, in accordance with an embodiment of the present invention. The instruction subset is limited to simple arithmetic operations, and does not include load/store operations, branches, saturation, multiplications, or any SIMD operations. These operations typically require larger dedicated logic which is not conducive to operation at the higher speeds necessary to process the chain of dependent instructions. Persons skilled in the relevant art(s) based on the teachings provided herein will further appreciate that any number of operations can be made available to SA 204, but that limiting this to a simple subset of operations generally simplifies the logic of SA 204 and allows for greater throughput. For example, in accordance with an embodiment of the present invention, SA 204 is operable to implement simple arithmetic SIMD operations. Accordingly, the exact instruction subset available to SA 204 is a factor of efficiency considerations and the particular application of IC 200. As further discussed in Section C, by restricting the register resources of SA 204, it is possible to use, for example, a dedicated set of registers which can be accessed by SA 204 at any stage in its execution, reducing the cost of register file access and bypass.

By adding a second or more SA 204 units, it is possible to process multiple chains of dependent instructions simultaneously, in accordance with an embodiment of the present invention. Since the instructions within a configuration are independent of the results provided by the instructions in any other configuration, multiple configurations can be processed in parallel. Persons skilled in the relevant art(s) based on the teachings provided herein will further appreciate that this can be accomplished by duplicating the entire SA 204 unit, or by duplicating only parts of the internal SA 204 unit logic and sharing the common logic between multiple pipelines processing two or more configurations simultaneously.

C. Program Design for the Sequential Accelerator

A key feature of the example system of FIG. 2 is that SA 204 is readily available for use by a program developer or a compiler. This is in contrast to what is termed in the art as a "double-pumped" ALU, which processes two arithmetic instructions simultaneously. In the case of the double-pumped ALU, even though it processes two instructions simultaneously, it is unable to resolve dependency problems between instructions, and the use of the double-pumped ALU is not open to the developer or compiler for targeted use. It is generally happenstance if the double-pumped ALU is used to accelerate instruction processing. Double-pumped ALUs are used in the art in, for example, the Pentium 4 processor developed by Intel Corporation of Santa Clara, Calif.

Programmers of SA 204 system identify sections of the code which contain a series of dependent instructions. This identification could also be done by a compiler, or at various other stages in the software development process. The series of dependent instructions should also be of a nature where they are represented by the simple operations available to SA 204 for execution. When such a chain of dependent instructions is found, they are pushed into configuration memory 206, where they are called for execution wherever they would normally appear within the code. In the event that only certain such dependency chains can be stored, those which are executed most often in the code are generally the best to place in the configuration memory 206. For example, a frequently called subroutine consisting of dependent instructions is an excellent candidate for SA 204 processing. Furthermore, constants used by the chain of dependent instructions are also stored in the configuration memory in order to simplify the design of SA 204.

Figure 4:
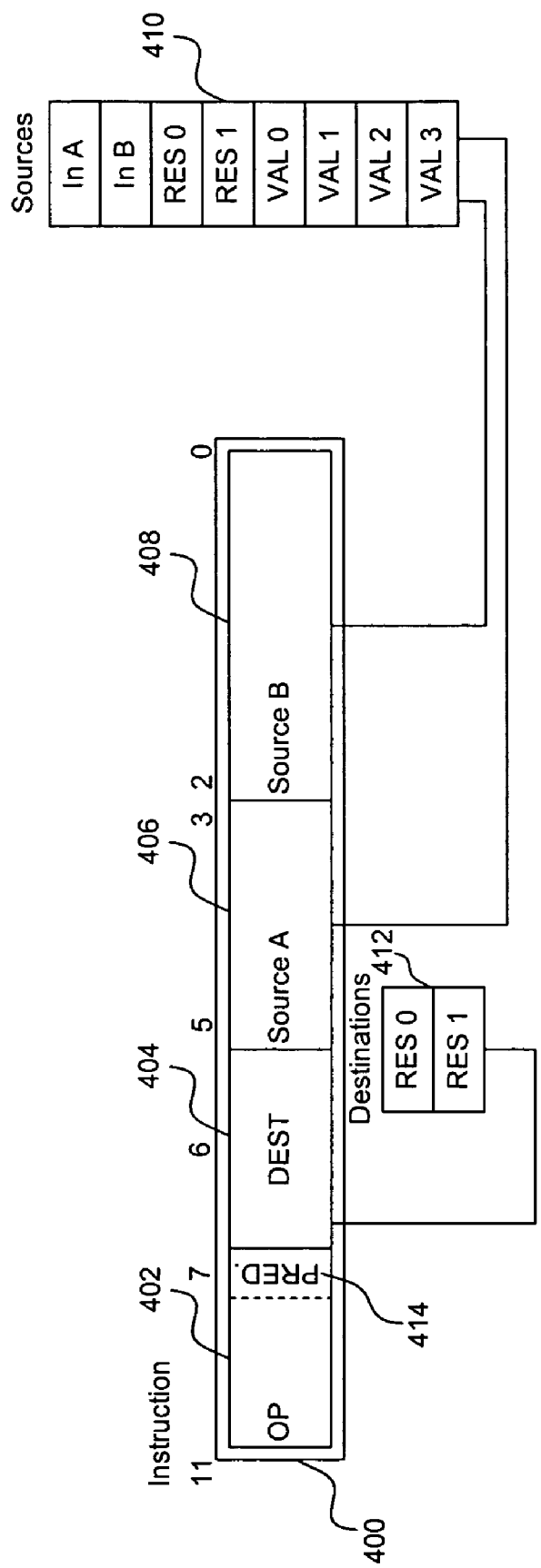
FIG. 4 depicts an instruction format used by a sequential accelerator system in accordance with an embodiment of the present invention.

FIG. 4 depicts an example instruction format used by SA 204. In accordance with this example, an instruction 400 destined for processing by SA 204 consists of a 5-bit opcode 402, a 1-bit destination field 404, a first 3-bit source field 406, and a second 3-bit source field 408. Persons skilled in the relevant art(s) based on the teachings provided herein will further appreciate that the bit-width, order, and presence of each field will change depending on the architecture of the system in which SA 204 is being implemented. Destination field 404 allows the selection between one of two result registers 412. Each source field 406, 408 allows the selection between any of a number of available sources that are stored along with the chain of dependent instructions. These sources include result registers 412, two constants InA and InB that are passed to SA 204 when the execution of a configuration is requested, and four constants VAL0-VAL3 that are loaded to configuration memory 206 through the execution of a PUTCFG instruction. Note that element 410 of FIG. 3 includes the destination registers 412 within it for illustrative purposes; the destination registers 412 are only physically present in a single location in the system.

Opcode field 402 represents which of the operations available to SA 204 the instruction 400 is intended to execute. In the example system, opcode field 402 also includes a predication bit 414. Predication bit 414, if set, indicates that a flag should be checked as a condition for executing the instruction. In the example system, this flag is a bit in one of the result registers 412. Persons skilled in the relevant art(s) based on the teachings provided herein will further appreciate that the inclusion of predicated operations is optional, and that if they are included, the condition can be implemented by executing a test on any memory location available to SA 204.

The programmer interacts with the SA by modifying the configuration memory and by invoking the execution of one of the configurations. In an implementation, a programmer uses a configuration store command (referred to herein as "PUTCFG") to select a configuration slot to write to and to populate the configuration slot with eight SA instructions and four constants. In the example method described above in reference to flowchart 300 of FIG. 3, the loading of the configuration memory is represented by steps 306 and 308. In accordance with an embodiment of the present invention, the configuration memory is modified through the use of several store commands to populate the configuration memory with SA instructions and constants.

The example system further provides a method of retrieving any of the configuration information. The example system also provides a method of invoking the execution of a configuration 310 by allowing the programmer to state which configuration to invoke 314, where to store the result 316, and further allows the programmer to provide two values which are accessible by the SA during execution. Further details regarding the invocation of a configuration are provided below.

D. Program Interaction with the System

Figure 5:
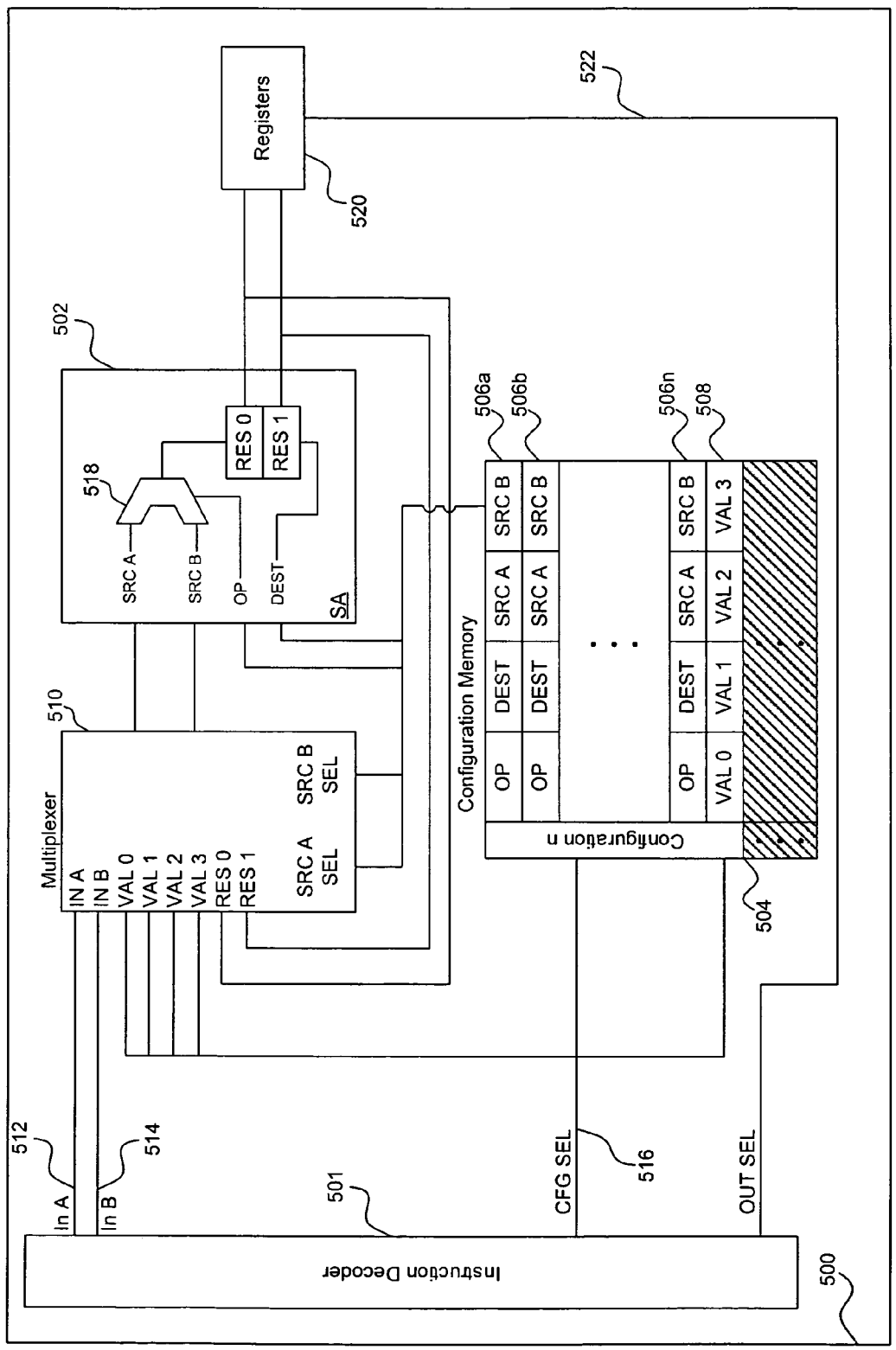
FIG. 5 depicts a similar system view to FIG. 2, but further illustrates the contents of the configuration memory and how information flows between the various components, in accordance with an embodiment of the present invention.

FIG. 5 depicts details of an SA 502 and components that directly interface with it in accordance with an implementation of the present invention. All of these components are shown to be physically located within a GPP 500, though persons skilled in the relevant art(s) based on the teachings provided herein will further appreciate that any component may also be located outside of GPP 500.

As shown in FIG. 5, GPP 500 contains an instruction decoder 501, a configuration memory 504, a multiplexer 510, an SA 502, and registers 520. Instruction decoder 501 is coupled to registers 520 by an output select bus 522, to configuration memory 504 by a configuration select bus 516, and to multiplexer 510 by two input buses shown as input bus A ("InA") 512 and input bus B ("InB") 514.

Configuration memory 504 holds multiple configurations which are to be processed by SA 502. Each of the multiple configurations contains a number of instructions 506a-506n and a number of constants 508.

SA 502 contains an arithmetic logic unit ("ALU") 518, which is connected to multiplexer 510 and provides a result to registers 520. One of skill in the relevant art(s) will appreciate that while an ALU generally performs basic arithmetic operations, any number of possible operations can be implemented in the particular unit shown as ALU 518.

When an instruction to execute a configuration is received within GPP 500 by instruction decoder 501, as shown in step 302 of FIG. 3, the instruction is decoded into several parts, as shown in step 304. In accordance with an embodiment of the present invention, the instruction to execute a configuration takes the general form:

{pn.}SA{0 . . . n} Result, InA, InB; or
{pn.}SA{0 . . . n} Result0/Result1, InA, InB The instruction first consists of an option of whether or not to execute the instruction at all based on a predicate "pn." This predicate points to a location of predicate registers in GPP 500 containing a flag which, if set, prevents the execution of the entire configuration. One of skill in the relevant arts will appreciate that the use of a predicate is optional in the course of executing SA operations.

The instruction next consists of a value indicating which configuration to select, shown as {0 . . . n}. This value corresponds to one of the n available configurations.

Next is an option of where to store the result, and is the differentiator between the two instructions shown above. SA 502 produces two result values internally. The first instruction shown indicates that the first such internal result value should be stored to the location specified, whereas the second instruction shown indicates that both internal result values should be stored to the two locations specified.

Finally, the instruction also contains two constant values for use during processing of the configuration. These constant values shown as InA and InB are passed to the SA 502 if needed for processing an instruction.

The option of which configuration to select is transmitted over configuration select bus 516 to configuration memory 504 in order to indicate which configuration should be sent to SA 502. The option of where to store the result is transmitted to registers 520 over output select line 522 to indicate what location should host the result of processing by SA 502. Persons skilled in the relevant art(s) will appreciate that registers 520 could be any sort of memory used for storing results produced by SA 502. The two constant values decoded from the instruction are sent to multiplexer 510 over two input buses 512, 514.

Each of the instructions 506a-506n is then sent to SA 502 for processing. As noted above, an SA instruction consists of an opcode, a destination, and two sources. The source fields serve as selectors into multiplexer 510 which communicates the requested sources to SA 502. The opcode indicates to ALU 518 what operation to perform on the source values. One of skill in the relevant arts will appreciate that ALU 518 could be any sort of processing unit dedicated to handling instructions of any nature, but is shown as an ALU in order to indicate the simplified operation of SA 502 in performing a subset of the instructions available to GPP 500.

The destination field indicates where to store the result of the operation, internal to SA 502. This process repeats as long as the instructions 506a-506n are not exhausted. Once the final instruction 506a-506n is processed by SA 502, the result is sent to registers 520, the target register indicated by the output select line 522 as noted above.

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for processing instructions in an integrated circuit (IC) chip comprising a processor and a sequential accelerator, the method comprising:

storing a plurality of operations to be processed by the sequential accelerator in a configuration block of a configuration memory, the operations having been pre-selected based on dependency of each of the operations on at least one other of the operations;

receiving and processing a first instruction in the processor; and responsive to the processing of the first instruction by the processor:

selecting the configuration block for processing by the sequential accelerator based on a configuration block selection value of the first instruction;

processing the operations in the sequential accelerator, and providing the results of the operations in the sequential accelerator to the processor, wherein an instruction set of the sequential accelerator is a subset of an instruction set of the processor.

2. The method of claim 1, wherein storing the operations is performed responsive to the processing of a second instruction by the processor.

3. The method of claim 2, wherein processing the second instruction in the processor comprises:

storing data to be used by the sequential accelerator when processing the operations in the configuration block, wherein the data is included with the second instruction.

4. The method of claim 1, wherein processing the first instruction in the processor comprises:

decoding the first instruction to identify the configuration block holding the operations to be processed by the sequential accelerator.

5. The method of claim 1, wherein processing the operations in the sequential accelerator further comprises:

processing the operations asynchronously relative to the processor.

6. The method of claim 1, wherein processing the operations in the sequential accelerator further comprises:
processing the operations at a multiple clock rate relative to the processor.

7. The method of claim 1, further comprising:
receiving additional instructions in the processor; and
continuing processing of the additional instructions in the processor without waiting for the sequential accelerator to finish processing the operations.

8. The method of claim 1, wherein processing the operations in the sequential accelerator further comprises:
determining whether each of the operations is predicated;
processing each of the operations that is predicated only if a flag is set; and
processing each of the operations that is not predicated.

9. The method of claim 1, further comprising:
determining whether the first instruction is predicated;
performing the selecting the configuration block, the processing the operations, and the providing the results only if a flag is set, if the first instruction is predicated; and
performing the selecting the configuration block, the processing the operations, and the providing the results if the first instruction is not predicated.

10. An integrated circuit for processing sequential instructions, the IC comprising:
a processor;
a sequential accelerator having an instruction set that is a subset of an instruction set of the processor; and
a configuration memory comprising configuration blocks, each configuration block comprising a plurality of operations to be processed by the sequential accelerator, the operations having been pre-selected based on dependency of each of the operations on at least one other of the operations;
wherein the processor selects the operations to be processed by the sequential accelerator when the processor executes an instruction triggering processing by the sequential accelerator of the configuration block comprising the operations, based on a configuration block selection value of the instruction.

11. The integrated circuit of claim 10, wherein the sequential accelerator determines whether each of the operations is predicated, processes each of the operations that is predicated only if a flag is set, and processes each of the operations that is not predicated.

12. The integrated circuit of claim 10, wherein the processor selects the operations to be processed only if a flag is set if the instruction triggering processing is predicated, and wherein the processor selects the operations to be processed if the instruction triggering processing is not predicated.

13. The integrated circuit of claim 10, wherein each of the configuration blocks further comprise:
one or more constant information fields;
wherein the constant information fields are accessible by the processor and by the sequential accelerator, and
wherein the constant information fields are set by the processor.

14. The integrated circuit of claim 10, further comprising:
a memory location having one or more result fields internal to the sequential accelerator;
wherein the sequential accelerator is configured to store information in the one or more result fields, and
wherein the processor is configured to read information from the one or more result fields.

15. The integrated circuit of claim 10, further comprising:
one or more internal registers, located within the sequential accelerator;
wherein the one or more internal registers are used by the sequential accelerator during processing, and
wherein the one or more internal registers are not accessible by the processor.

16. The integrated circuit of claim 10, further comprising:
a pipeline, located within the processor, the pipeline for processing instructions in stages.

17. A pipeline located within a processor, the pipeline comprising:
an instruction decode stage; and
an instruction configuration path that configures a sequential accelerator to process a plurality of operations in a configuration block of a configuration memory, the operations having been pre-selected based on dependency of each of the operations on at least one other of the operations;
wherein the instruction decode stage receives an instruction requesting the configuration of the sequential accelerator to process the operations in the configuration block,
wherein the instruction decode stage decodes the instruction to determine a configuration block selection value and triggers the configuration of the sequential accelerator, using the instruction configuration path, to enable it to process the operations in the configuration block associated with the configuration block selection value, and
wherein an instruction set of the sequential accelerator is a subset of an instruction set of the processor.

* * * * *